J. F. NICHOLSON.
NUT LOCK.
APPLICATION FILED FEB. 3, 1910.
960,999.
Patented June 7, 1910.
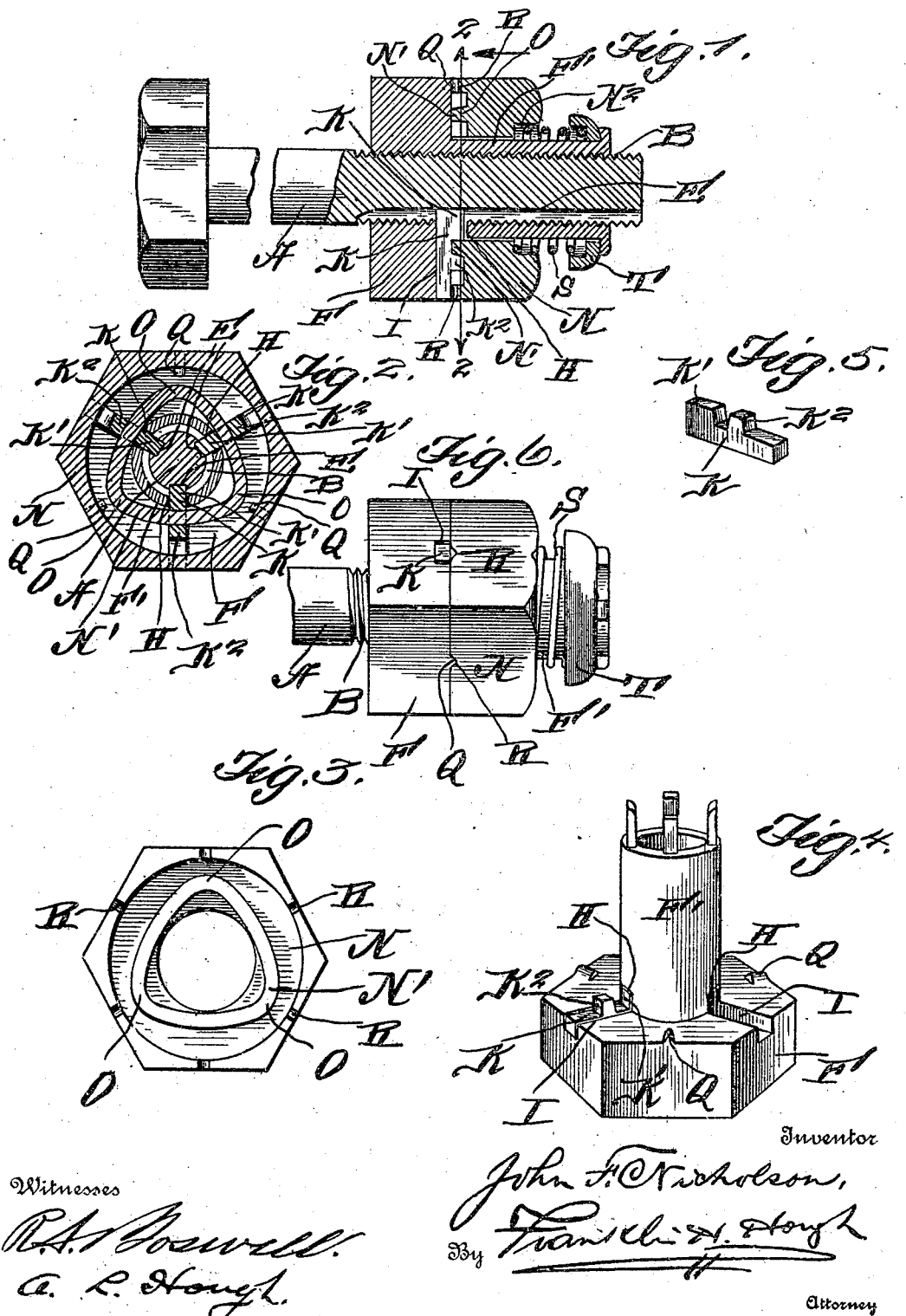

UNITED STATES PATENT OFFICE.

JOHN F. NICHOLSON, OF SOMERSET, PENNSYLVANIA.

NUT-LOCK.

960,999.  Specification of Letters Patent.  Patented June 7, 1910.

Application filed February 3, 1910. Serial No. 541,670.

*To all whom it may concern:*

Be it known that I, JOHN F. NICHOLSON, a citizen of the United States, residing at Somerset, in the county of Somerset and State of Pennsylvania, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in nut locks and comprises various details of construction and combinations and arangements of parts which will be hereinafter fully described and then specifically defined in the appended claims.

I illustrate my invention in the accompanying drawings, in which:—

Figure 1 is a longitudinal sectional view through one end of the bolt and nuts thereon. Fig. 2 is a sectional view on line 2—2 of Fig. 1. Fig. 3 is a bottom plan view of a nut having a cam groove therein. Fig. 4 is a detail perspective view of one of the nuts, and Fig. 5 is a detail view of the spring connected to the outer nut. Fig. 6 is a view in elevation showing the nuts locked together.

Reference now being had to the details of the drawings by letter, A designates a bolt having a threaded portion B, which threaded portion has longitudinal channels E formed therein.

F designates a nut having a central threaded bore and an interiorly threaded extension shell F' provided with a series of longitudinal slots H, each of which registers with a radial channel I formed in the outer face of the nut F.

Independently mounted sliding keys, designated by letter K and provided with lugs K' and K² are provided, one for each of said channels in which they are adapted to have a sliding longitudinal movement, the lugs K' at the inner ends of the keys being adapted to register with and enter the slots H and channels E to hold the nut from rotation upon the bolt.

N designates a nut having a central aperture adapted to fit over said shell and is provided upon its inner face with a cam outlined rib N' adapted to engage between the lugs K' and K² of said keys and, as said nut N is rotated upon the shell, to cause said keys to move into or out of locking relation by means of said cam rib bearing against one or another of the lugs K' or K². For instance, in the event of the portions O of said cam rib being moved against the lug K², the key carrying said lug will be moved out of the slot E of the bolt and, when the portions of the rib intermediate the parts O bear against the lug K' by the rotary movement of the nut N, the keys will be thrown into a locked position. As there are three of said keys shown in the drawings, they will all be moved simultaneously into or out of locked relation.

Radial ribs Q project from the outer face of the nut F and are adapted to engage radial grooves R formed in the inner face of the nut N and serve normally to prevent rotation of one nut relative to the other. A coiled spring S is seated in a recess N² in the outer face of the nut N and held in place by means of a washer T, which is recessed out and mounted upon the shank portion of the extension F' and bears against the end of the recess N² and the recess in said washer, and being provided for the purpose of normally holding the nuts in locked relation at the same time allowing the nuts to be moved into or out of said locked relation.

What I claim to be new is:—

1. A nut lock comprising, in combination with a bolt having a threaded portion with longitudinal channels intersecting the threads, a nut having an integral shell interiorly threaded and provided with radial slots, keys movable in said slots and provided with laterally projecting lugs and adapted to engage the channels of the bolt, a nut fitted over said shell, means for securing the nut upon the latter and provided with a cam outlined rib upon its face adapted to engage with a lug upon each of said keys whereby, as said rib is turned, the keys may be simultaneously moved into or out of locking relation.

2. A nut lock comprising, in combination with a bolt having a threaded portion with longitudinal channels intersecting the threads, a nut having an integral shell interiorly threaded and provided with radial slots, keys movable in said slots and provided with laterally projecting lugs and adapted to engage the channels of the bolt, a nut fitted over said shell, means for securing the nut upon the latter and provided with a cam outlined rib upon its face adapted to engage with a lug upon each of said keys whereby, as said rib is turned, the keys may be simultaneously moved into or out of locking relation, a coiled spring fastened to said nut provided with the rib and adapted to allow the nut to turn.

3. A nut lock comprising, in combination with a bolt having a threaded portion with longitudinal channels intersecting the threads, a nut having an integral shell interiorly threaded and provided with radial slots, keys movable in said slots and provided with laterally projecting lugs and adapted to engage the channels of the bolt, a nut fitted over said shell, means for securing the nut upon the latter and provided with a cam outlined rib upon its face adapted to engage with a lug upon each of said keys whereby, as said rib is turned, the keys may be simultaneously moved into or out of locking relation, ribs projecting from the outer face of the slotted nut and adapted to engage grooves in the adjacent face of the nut having said cam outlined rib.

4. A nut lock comprising, in combination with a bolt having a threaded portion with longitudinal channels intersecting the threads, a nut having an integral shell interiorly threaded and provided with radial slots, keys movable in said slots and provided with laterally projecting lugs and adapted to engage the channels of the bolt, a nut fitted over said shell and provided with a cam outlined rib upon its face adapted to engage with a lug upon each of said keys whereby, as said rib is turned, the keys may be moved into or out of locking relation, said nut provided with the cam outlined rib having a recess in its outer face, a coiled spring seated therein and engaging said shell, and a washer engaging said spring.

In testimony whereof I hereunto affix my signature in the presence of two witnesses.

JOHN F. NICHOLSON.

Witnesses:
  A. F. Dickey,
  A. J. Coleman.